Figure 1:
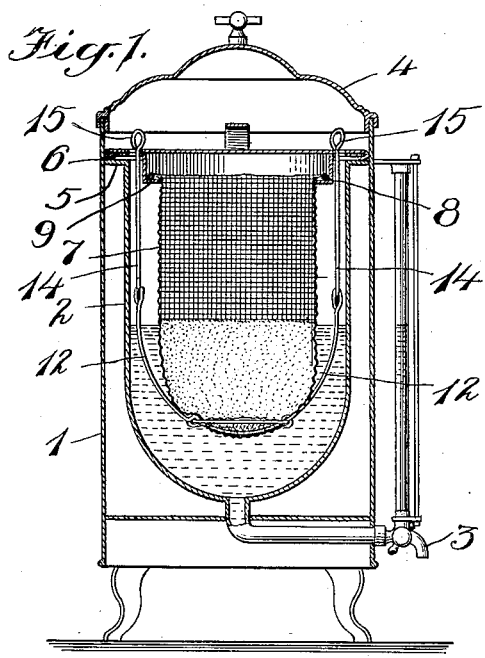

T. J. HOWLETT.
APPARATUS FOR BREWING TEA, COFFEE, AND OTHER BEVERAGES.
APPLICATION FILED DEC. 13, 1911.

1,024,076.

Patented Apr. 23, 1912.

Witnesses:

Inventor
T. J. Howlett,
By his Attorneys

UNITED STATES PATENT OFFICE.

THOMAS J. HOWLETT, OF NEW YORK, N. Y.

APPARATUS FOR BREWING TEA, COFFEE, AND OTHER BEVERAGES.

1,024,076.  Specification of Letters Patent.  Patented Apr. 23, 1912.

Application filed December 13, 1911. Serial No. 665,459.

*To all whom it may concern:*

Be it known that I, THOMAS JOSEPH HOWLETT, a subject of the King of Great Britain, residing in city, county, and State of New York, have invented certain new and useful Improvements in Apparatus for Brewing Tea, Coffee, and other Beverages, of which the following is a full, clear, and exact description.

My invention relates to an improved apparatus for brewing tea, coffee and other beverages.

In the drawings I have shown an apparatus best adapted for making coffee, and I shall proceed to describe the invention as applied thereto.

The main object, broadly speaking, is to provide an effective means for thoroughly extracting the juices of the entire amount of coffee used in the apparatus.

Figure 2:
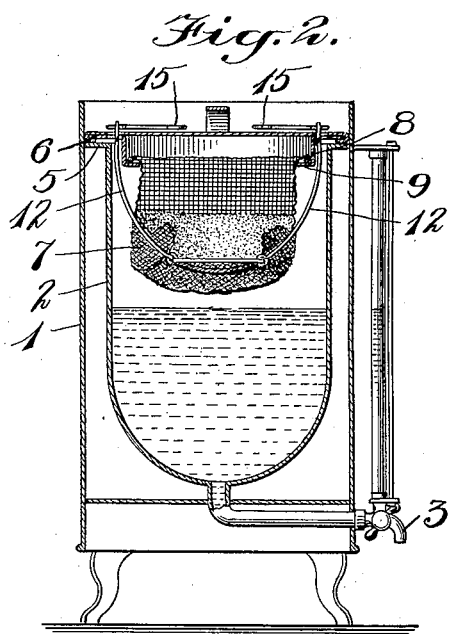
Figure 3:
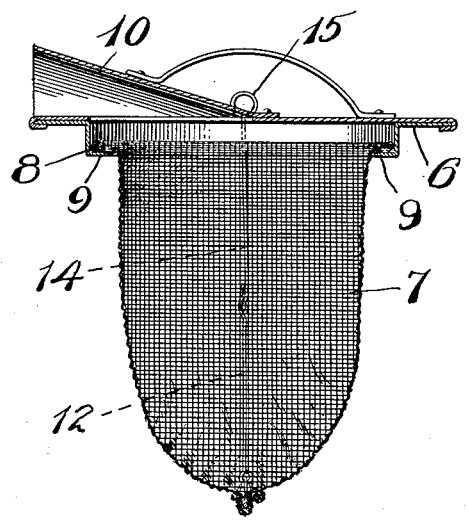
Figure 4:
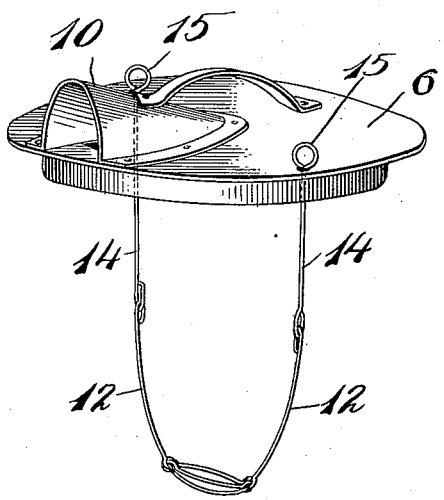

In the drawings, Figure 1 is a vertical section of the entire apparatus in one of its preferred forms. Fig. 2 is a similar view showing the parts in a different position. Fig. 3 is a relatively enlarged side elevation of certain details. Fig. 4 is a perspective view of certain parts.

1 represents an outer casing.

2 represents an inner casing mounted in the outer casing. The space between the casings 1 and 2 is designed to hold water heated to the proper temperature to maintain heat in the contents of the inner casing 2.

3 is a draw-off faucet connected by a pipe to the inner casing 2 which contains the beverage.

4 is a top cover for the outer casing 1 to close the same.

5 is a shoulder or flange at the upper edge of the inner casing 2 located below the upper edge of the outer casing.

6 is a combined bag support and inner cover arranged to be supported upon the flange 2. This cover 6 is separate from the top cover 4.

7 is a bag which is usually formed of suitable porous fabric and is designed to contain the coffee to be used in making the beverage. This bag is preferably supported by a collapsible ring 8 which may be sprung into an annular space above the shoulder 9 on the lower side of the cover 6. The top of the cover 6 is open at one point to admit hot water. 10 is a shield for said opening.

In an apparatus, such as shown in the drawings, a suitable hot water inlet pipe is customarily provided at the side of the outer casing 1 to inject water into the bag containing the coffee. Such a hot water supply pipe is so well known as to require no illustration or further description.

I also provide a combined coffee agitator and lifting device for the bag 7, one simple form of which is illustrated in the drawings, in which 12—12 represent the side arms of a stirrup-like device arranged to stand under the lower end of the bag 7.

14—14 are two lift rods hinged to the side members of the stirrup-like device and passing up through small openings in the top of the inner cover 6.

15—15 are handles at the upper ends of the lift rods 14—14.

When the bag 7 has been filled to the proper degree with a sufficient amount of coffee, it is placed bodily with the cover 6 into the position shown in Fig. 1. Hot water is then admitted and allowed to absorb the juices of the coffee within the bag 7. Since said bag usually holds a considerable quantity, I have found that much more satisfactory results can be obtained by agitating the coffee while the process of absorption is going on. To do this without loss, I remove only the top cover 4 and by moving the rods 14—14 up and down several times, the coffee within the bag 7 will be agitated to such an extent as to thoroughly stir it up and permit the hot water to reach every particle. When the coffee is finally completed and the juice is fully extracted from the coffee bean, it is desirable that the then useless bean be lifted from the beverage. To that end the lift rods are pulled up through the inner cover 6 until said lift rods may be turned over into the position shown in Fig. 2, wherein they will serve to hold the combined agitator and lifter in an elevated position, as shown in Fig. 2. During this entire process, it will be observed that the aroma of the coffee is not permitted to escape by reason of the presence of the inner cover 6 which stands over the inner beverage receptacle or casing 2.

The ring 8 may be easily formed from a strip of wire bent into circular form of appropriate size for the edge of the bag 7 at the mouth or open end. This edge of the bag may be sewed to said ring. Since the ends of the ring are not united, said ring may be collapsed sufficiently to insert it (with the upper edge of the bag) in the space above the supporting shoulder 9 at the lower side of the inner cover 6. In this way a fresh bag may be substituted as often as desired.

What I claim is:

1. In an apparatus of the character described, a liquid receptacle having a discharge outlet near its lower end, a cover for said receptacle, a porous bag and means for connecting the same to said cover, and a combined agitator and lifting device, part of said agitator extending up through said cover whereby the contents of the bag may be agitated without removing the cover, said cover being apertured to permit of the passage therethrough of part of said agitator.

2. In an apparatus of the character described, a liquid receptacle having a discharge outlet near its lower end, a cover for said receptacle, a porous bag and means for connecting the same to said cover, a combined agitator and lifting device engaging said bag, part of said agitator extending up through said cover whereby the same may be agitated without removing said cover, and means for holding said agitator in an elevated position within the receptacle, said cover being apertured to permit of the passage therethrough of said part of said agitator.

3. In an apparatus of the character described, a liquid receptacle having a discharge outlet near its lower end, a cover for said receptacle, a porous bag and means for connecting the same to said cover, and an agitator having a stirrup-like portion extending under said bag and up on each side thereof and piercing said cover at two points, said cover being suitably apertured to permit said agitator to pass therethrough.

4. In an apparatus of the character described, a liquid receptacle having a discharge outlet near its lower end, a cover for said receptacle, a porous bag and means for connecting the same to said cover, and an agitator having a stirrup-like portion extending under said bag and up on each side thereof and piercing said cover at two points, said cover being suitably apertured to permit said agitator to pass therethrough, said cover also having an opening for the admission of liquid to the inside of the bag supported thereby.

5. In an apparatus of the character described, a liquid receptacle having a discharge outlet near its lower end, a cover for said receptacle, a porous bag and means for detachably connecting the same to said cover, means whereby said bag and its contents may be agitated, said cover being suitably apertured to permit of the passage therethrough of part of said agitator, and a part of said agitator passing through said apertured portion of said cover whereby said agitator may be operated without removing said cover from said receptacle.

6. In an apparatus of the character described, a liquid receptacle having a discharge outlet near its lower end, a cover for said receptacle, a porous bag and means for detachably connecting the same to said cover, said means comprising a supporting shoulder upon the under side of the cover and a collapsible ring secured to the edge of the mouth of said bag, and a combined agitator and bag lifting device coacting with said bag, part of said device passing upwardly through said cover, said cover being properly apertured to permit of the passage therethrough of said part of said agitator.

7. In an apparatus of the character described, a liquid receptacle having a discharge outlet near its lower end, a cover for said receptacle, a porous bag and means for detachably connecting the same to said cover, said means comprising a supporting shoulder upon the under side of the cover and a collapsible ring secured to the edge of the mouth of said bag, a combined agitator and bag lifting device coacting with said bag, part of said device passing upwardly through said cover, said cover being properly apertured to permit of the passage therethrough of said part of said agitator, and means to hold said agitator and bag lifting device in an elevated position.

8. In an apparatus of the character described, a liquid receptacle having a discharge outlet near its lower end, a cover for said receptacle, a porous bag and means for connecting the same to said cover, an agitator co-acting with said bag for agitating the contents of said bag, an outside receptacle surrounding the first named receptacle and forming a water jacket around the latter, said outside receptacle being open at the top to give access to the cover for the inside receptacle, and a separate cover or top for the outside receptacle, said inside cover being apertured to permit of the passage therethrough of part of said agitator, part of said agitator passing therethrough whereby the contents of said bag may be agitated without removing the inside cover.

THOMAS J. HOWLETT.

Witnesses:
R. C. MITCHELL,
E. E. MORSE.

---

Copies of this patent may be obtained for five cents each, by addressing the "Commissioner of Patents, Washington, D. C."